Patented June 4, 1940

2,203,206

UNITED STATES PATENT OFFICE 2,203,206

RESIN FROM CASHEW NUTSHELL OIL AND ANOTHER PHENOL

Alvin F. Shepard, Kenmore, and Joseph F. Boiney and Lothar Sontag, North Tonawanda, N. Y., assignors to General Plastics, Inc., North Tonawanda, N. Y.

No Drawing. Application May 14, 1937, Serial No. 142,658

14 Claims. (Cl. 260—46)

This invention relates to synthetic resin and methods of producing the same and more particularly to synthetic resins manufactured from cashew nutshell oil.

The cashew nut has long been known to carry inside the hard, horny shell thereof a brownish colored oil completely filling the cellular structure surrounding the kernel. This oil is of low viscosity, has an iodine value of from about 200 to 300 and has a virulent action on the skin.

It has been suggested heretofore to reduce the virulent action of the oil by subjecting the same to heat treatment whereupon the oil can be changed in the presence of acid or alkaline catalysts to resinous products. It has also been suggested to react the oil with formaldehyde with the preparation of a synthetic resin possessing certain characteristics.

It is an object of the present invention to provide a method for producing a phenolic resin from cashew nutshell oil, a resin possessing the desirable characteristics of the normal phenol-aldehyde resins with respect to ability to set up under heat and to be molded into desirable commercial products.

The phenolic body reacted with the cashew nutshell oil may be carbolic acid or phenol itself, its homologs, such as xylenol, or polyhydric phenols, such as resorcinol and the like, as well as polynuclear phenols. The reaction between the cashew nutshell oil and the phenol occurs either with or without the use of catalysts, although in certain instances better yields of products are obtained by carrying out the reaction with a catalyst. In general, any of the well-known resin-forming catalysts may be employed; certain of the acid catalysts, for instance, sulphuric acid are eminently suitable. The metallic salt catalysts such as zinc chloride and the like are in many instances preferred for this purpose.

The reaction between the cashew nutshell oil and the phenol is carried out by heating these materials together until resin formation occurs whereupon the resin may be separated from any unreacted phenol or other impurities by distillation.

The resins are yellowish to reddish black in color and are thermo-setting when mixed with hexamethylenetetramine or its equivalent, such as formaldehyde solutions, other aldehydes or other methylene containing bodies. To this end the resins may be rendered thermosetting by admixture with methylol phenols or methylol ureas or mixed with the well known types of phenolic resins to yield useful materials. For certain purposes, therefore, it is not essential that the resin mixture be freed of unreacted phenols and the crude mixtures may be used for the production of resins by the above procedures.

In the manufacture of the resin of the present invention either raw cashew nutshell oil or the heat treated product may be employed as starting material since resin formation will occur in either case upon reaction with a phenolic product.

The result of a series of experiments is given in the following table wherein 400 grams of phenol were heated with 400 grams of raw cashew nutshell oil with the indicated catalyst at a temperature of 130 to 140° C. under a reflux and held at this temperature for about 15 minutes. Resinification had occurred and heating was thereafter continued under vacuum and excess phenol removed at a temperature of about 240° C.

*Table I*

| Catalyst | Resin in grams |
|---|---|
| 20 g. stannic chloride | 413 |
| 8 g. 92% sulfuric acid | 445 |
| 20 g. 85% phosphoric acid | 406 |
| 20 g. zinc chloride | 413 |
| 20 g. caustic soda | 418 |

The resin can also be prepared from phenol homologs either from the raw oil or the heat treated oil. 1000 grams of a commercial xylenol fraction boiling within the range 206 to 225° C. were mixed with 1000 grams of heat treated cashew nutshell oil and 69 grams of concentrated sulfuric acid added for promoting the reaction. The mixture was heated to 130° C. and maintained at this temperature for 30 minutes. Heating was thereafter continued under full vacuum at about 260° C. whereby the resinous product was freed of impurities. Yield 1350 grams.

Similar reaction or condensation between cashew nutshell oil and polyhydric phenols may be effected with and with or without a catalyst.

Thus, 100 grams of resorcinol and 100 grams of raw cashew nutshell oil were gradually heated from room temperature to 315° C. over a period of ninety minutes. This yielded 177 grams of a brittle resin. In contrast, a mixture of 100 grams of resorcinol and 100 grams of raw cashew nutshell oil, heated from room temperature to 315° C. over a period of ten minutes yielded 125 grams of a soft resin.

In like fashion, 100 grams of hydroquinone and 100 grams of raw cashew nutshell oil were heated from room temperature to 315° C. over a period of one hundred-fifty minutes and yielded 125 grams of a brittle resin.

Polynuclear phenols react with cashew nutshell oil with resin formation. This reaction is preferably performed in the presence of an acid catalyst. Thus 410 grams of resin were obtained by mixing 250 grams of commercial beta naphthol with 12.5 grams of fuming sulfuric acid and reacting with 250 grams of cashew nutshell oil at 135° C. for one hour. Uncombined beta naphthol was removed by vacuum distillation.

The resinous product of the reaction between a phenol and cashew nutshell oil possesses excellent properties with respect to time of cure, finish of molded product and flexibility of resin.

A sample of resin produced by reacting 1500 grams of commercial xylenol (boiling range 206° C.–225° C.) and 1500 grams raw cashew nutshell oil, using 103.5 grams concentrated sulfuric acid, at 130° C. for thirty minutes and removing excess xylenol in vacuum at 260° C., possessed a typical reddish color, was soluble in diethylene glycol and the drying oils, as, for instance, linseed oil and China-wood oil. The yield of resin was 2150 grams. The resin was characterized by an ASTM softening point of 36° C. When mixed with 10% hexamethylenetetramine a cure was obtained in 120 seconds at 165° C.

What is claimed is:

1. The method of manufacturing a synthetic resin from cashew nutshell oil which comprises heating a mixture consisting of the oil and another phenol in resinifying proportions until resinification occurs.

2. The method of manufacturing a synthetic resin from cashew nutshell oil which comprises refluxing a mixture consisting of the oil and another phenol in resinifying proportions until resinification occurs.

3. The method of manufacturing a synthetic resin from cashew nutshell oil which comprises heating a mixture consisting of the oil and another phenol until resinification occurs and then continuing heating the mixture under a vacuum.

4. As a synthetic resin, the reaction product obtained by reacting the ingredients of a mixture consisting of cashew nutshell oil and another phenol until resinification occurs.

5. As a synthetic resin, the reaction product obtained by reacting the ingredients of a mixture consisting of cashew nutshell oil and cresol until resinification occurs.

6. As a synthetic resin, the reaction product obtained by reacting the ingredients of a mixture consisting of cashew nutshell oil and xylenol until resinification occurs.

7. The method of manufacturing a synthetic resin from cashew nutshell oil which comprises reacting the ingredients of a mixture consisting of the oil and another phenol until resinification occurs.

8. The method of manufacturing a synthetic resin from cashew nutshell oil which comprises reacting the ingredients of a mixture consisting of the oil and cresol until resinification occurs.

9. The method of manufacturing a synthetic resin from cashew nutshell oil which comprises reacting the ingredients of a mixture consisting of the oil and xylenol until resinification occurs.

10. As a synthetic resin the reaction product obtained by reacting the ingredients of a mixture consisting of cashew nutshell oil and another mono nuclear phenol until resinification occurs.

11. As a synthetic resin the reaction product obtained by reacting the ingredients of a mixture consisting of cashew nutshell oil and a poly nuclear phenol until resinification occurs.

12. The method of manufacturing a synthetic resin from cashew nutshell oil which comprises reacting the ingredients of a mixture consisting of the oil and another phenol in the presence of a catalyst until resinification occurs.

13. The method of manufacturing a synthetic resin from cashew nutshell oil which comprises reacting the ingredients of a mixture consisting of the oil and another phenol in the presence of an acid catalyst until resinification occurs.

14. The method of manufacturing a synthetic resin from cashew nutshell oil which comprises reacting the ingredients of a mixture consisting of the oil and another phenol in the presence of a basic catalyst until resinification occurs.

ALVIN F. SHEPARD.
JOSEPH F. BOINEY.
LOTHAR SONTAG.